(12) United States Patent
Schaefer et al.

(10) Patent No.: US 12,061,697 B2
(45) Date of Patent: Aug. 13, 2024

(54) AUTOMATED DETECTION OF MALICIOUS PACKAGES IN A SOFTWARE REPOSITORY

(71) Applicant: Microsoft Technology Licensing, LLC, Redmond, WA (US)

(72) Inventors: Max Schaefer, Kidlington (GB); Adriana Sejfia, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 17/673,142

(22) Filed: Feb. 16, 2022

(65) Prior Publication Data

US 2023/0259620 A1    Aug. 17, 2023

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .............. G06F 21/565; G06F 21/563; G06F 2221/033; G06N 5/022; G06N 5/01; H04L 63/126
See application file for complete search history.

(56) References Cited

U.S. PATENT DOCUMENTS

2012/0240236 A1* 9/2012 Wyatt .................. G06F 21/562
                                                           726/25
2021/0234880 A1    7/2021 Mclane et al.

OTHER PUBLICATIONS

"International Search Report and Written Opinion Issued in PCT Application No. PCT/US22/050820", Mailed Date: Mar. 24, 2023, 10 Pages.
Alfadel, et al., "Empirical Analysis of Security Vulnerabilities in Python Packages", In Proceedings of the IEEE International Conference on Software Analysis, Evolution and Reengineering, Mar. 9, 2021, pp. 446-457.
Avdiienko, et al., "Mining Apps for Abnormal Usage of Sensitive Data", In Proceedings of the IEEE/ACM 37th IEEE International Conference on Software Engineering, May 16, 2015, pp. 426-436.
Bagmar, et al., "I Know What You Imported Last Summer: A study of security threats in the Python ecosystem", In Repository of arXiv:2102.06301v1, Feb. 11, 2021, 12 Pages.

(Continued)

*Primary Examiner* — Paul E Callahan
(74) *Attorney, Agent, or Firm* — Workman Nydegger

(57) ABSTRACT

Detecting a malicious package associated with a software repository. A method identifies a subject package in a software repository, and extracts a feature set from the subject package. The feature set includes single-version features, including whether the subject package accesses personally identifying information, accesses specified system resource(s), uses specified application programming interface(s), includes installation script(s), and/or includes a binary, minified, or obfuscated file. The feature set also includes change features, including an amount of time since publication of a prior version of the subject package, a semantic update type, and/or how single-version feature(s) have changed since the prior version. The method provides the feature set as input to a set of classifiers, each being configured to use the feature set to generate a prediction of whether the subject package is malicious or benign. Based at least on the prediction, the method classifiers the subject package as being malicious or benign.

20 Claims, 5 Drawing Sheets

(56) References Cited

OTHER PUBLICATIONS

Baldwin, Adam, "Plot to steal cryptocurrency foiled by the npm security team", Retrieved From: https://web.archive.org/web/20190606030057/https://blog.npmjs.org/post/185397814280/plot-to-steal-cryptocurrency-foiled-by-the-npm, Jun. 6, 2019, 2 Pages.

Birsan, Alex, "Dependency Confusion: How I Hacked Into Apple, Microsoft and Dozens of other Companies", Retrieved From: https://medium.com/@alex.birsan/dependency-confusion-4a5d60fec610, Feb. 9, 2021, 12 Pages.

Cai, et al., "A study of runtime behavioral evolution of benign versus malicious apps in android", In Journal of Information and Software Technology, vol. 122, Feb. 22, 2020, 15 Pages.

Chen, et al., "Finding Unknown Malice in 10 Seconds: Mass Vetting for New Threats at the Google-Play Scale", In Proceedings of the 24th USENIX Symposium, Aug. 10, 2016, pp. 659-674.

Duan, et al., "Towards Measuring Supply Chain Attacks on Package Managers for Interpreted Languages", In Proceedings of 28th Annual Network and Distributed System Security Symposium, Feb. 21, 2021, 17 Pages.

Ferreira, et al., "Containing Malicious Package Updates in npm with a Lightweight Permission System", In Proceedings of IEEE/ACM 43rd International Conference on Software Engineering, Nov. 5, 2021, pp. 1334-1346.

Garrett, et al., "Detecting Suspicious Package Updates", In Proceedings of IEEE/ACM 43rd International Conference on Software Engineering, May 25, 2019, pp. 13-16.

Gkortzis, et al., "Software reuse cuts both ways: An empirical analysis of its relationship with security vulnerabilities", In Journal of Systems and Software, vol. 172, May 20, 2020, 14 Pages.

Gonzalez, "Anomalicious: Automated Detection of Anomalous and Potentially Malicious Commits on GitHub", In Proceedings of 2021 IEEE/ACM 43rd International Conference on Software Engineering: Software Engineering in Practice, Dec. 17, 2021, pp. 258-267.

Goswami, et al., "Investigating The Reproducibility of NPM Packages", In Proceedings of 2020 IEEE International Conference on Software Maintenance and Evolution, Sep. 28, 2020, pp. 677-681.

Goyal, "Identifying Unusual Commits on GitHub", In Journal of Software: Evolution and Process, vol. 30, Issue 1, Sep. 2017, 36 Pages.

Kazemian, et al., "Comparisons of machine learning techniques for detecting malicious webpages", In Journal of Expert Systems with Applications, vol. 42, Issue 3, Feb. 15, 2015, pp. 1166-1177.

Koishybayev, et al., "Mininode: Reducing the Attack Surface of Node.js Applications", In Proceedings of 23rd International Symposium on Research in Attacks, Intrusions and Defenses, 2020, pp. 121-134.

Mirhosseini, et al., "Can Automated Pull Requests Encourage Software Developers to Upgrade Out-of-Date Dependencies?", In Proceedings of the 32nd IEEE/ACM International Conference on Automated Software Engineering, Oct. 30, 2017, pp. 84-94.

Nielsen, et al., "Modular Call Graph Construction for Security Scanning of Node.js Applications", In Proceedings of the 30th ACM SIGSOFT International Symposium on Software Testing and Analysis, Jul. 11, 2021, pp. 29-41.

Ohm, et al., "Backstabber's Knife Collection: A Review of Open Source Software Supply Chain Attacks", In Proceedings of International Conference on Detection of Intrusions and Malware, and Vulnerability Assessment, Jul. 7, 2020, 24 Pages.

Ohm, et al., "Towards Detection of Software Supply Chain Attacks by Forensic Artifacts", In Proceedings of the 15th International Conference on Availability, Reliability and Security, Aug. 25, 2020, 6 Pages.

Omar, et al., "Machine Learning Techniques for Anomaly Detection: An Overview", In International Journal of Computer Applications, vol. 79, Issue 2, Oct. 2013, pp. 33-41.

Pfretzschner, et al., "Identification of Dependency-based Attacks on Node.js", In Proceedings of the 12th International Conference on Availability, Reliability and Security, Aug. 29, 2017, 6 Pages.

Prana, et al., "Out of sight, out of mind? How Vulnerable Dependencies Affect Open-Source Projects", In Journal of Empirical Software Engineering, vol. 26, Issue 4, Apr. 21, 2021, 37 Pages.

Ruohonen, et al., "A Large-Scale Security-Oriented Static Analysis of Python Packages in PyPI", In Repository of arXiv:2107.12699v2, Jul. 27, 2021, 10 Pages.

Taylor, et al., "Defending Against Package Typosquatting", In Proceedings of International Conference on Network and System Security, Dec. 19, 2020, 19 Pages.

Tschacher, Nikolai Philipp, "Typosquatting in Programming Language Package Managers", In the Dissertation Submitted to University of Hamburg for Bachelor Thesis, Mar. 17, 2016, 74 Pages.

Vu, et al., "A Convolutional Transformation Network for Malware Classification", In Proceedings of 6th Conference on Information and Computer Science, Dec. 12, 2019, pp. 234-239.

Vu, et al., "LastPyMile: Identifying the Discrepancy between Sources and Packages", In Proceedings of the 29th ACM Joint Meeting on European Software Engineering Conference and Symposium on the Foundations of Software Engineering, Aug. 18, 2021, pp. 780-792.

Vu, et al., "Poster: Towards Using Source Code Repositories to Identify Software Supply Chain Attacks", In Proceedings of the 2020 ACM Conference on Computer and Communications Security, Nov. 2, 2020, pp. 2093-2095.

Vu, et al., "Typosquatting and Combosquatting Attacks on the Python Ecosystem", In Proceedings of 2020 IEEE European Symposium on Security and Privacy Workshops, Sep. 7, 2020, pp. 509-514.

Wang, et al., "An Empirical Study of Usages, Updates and Risks of Third-Party Libraries in Java Projects", In Proceedings of 2020 IEEE International Conference on Software Maintenance and Evolution, Sep. 28, 2020, pp. 35-45.

Zerouali, et al., "On the Impact of Security Vulnerabilities in the npm and RubyGems Dependency Networks", In Repository of arXiv:2106.06747v1, Jun. 12, 2021, 38 Pages.

Zimmermann, et al., "Small World with High Risks: A Study of Security Threats in the npm Ecosystem", Retrieved From: https://www.usenix.org/conference/usenixsecurity19/presentation/zimmerman, Aug. 14, 2019, pp. 995-1010.

* cited by examiner

AUTOMATED DETECTION OF MALICIOUS PACKAGES IN A SOFTWARE REPOSITORY

BACKGROUND

Software repositories are commonly provided to host and distribute software packages comprising executable binaries, source code, data files, configuration files, and the like. Some software repositories (e.g., application distribution repositories) are used to distribute entire applications; for example, many Linux distributions provide software repositories that host application packages using the RPM package manager format, the Debian (deb) package manager format, and the like. Other software repositories (e.g., source code repositories) are used to distribute source code projects; examples are GitHub and GitLab. Yet other software repositories (e.g., code library repositories) are used to distribute programming language-specific libraries, frameworks, and even entire applications; for example, npm is a repository for JavaScript and Type-Script code libraries, hosting over 1.7 million packages. Yet other software repositories (e.g., container repositories) are used to distribute containerized applications; an example is the Docker Hub.

Software repositories have become a prime target for malicious actors, who publish new packages, or compromise existing packages, to introduce malware to the software repository. This can be particularly troublesome, since this malware affects any package that depends on a malicious package, even transitively. Malware can tamper with data on a machine on which it installed, can exfiltrate data from a machine on which it installed, can steal computing resources-such as by performing parasitical computations (e.g., Bitcoin mining), and/or engage in other malicious activities. Defending against the introduction of malicious packages into software repositories protects the integrity of the software supply chain; however, the sheer volume of package updates can make comprehensive manual review infeasible. For example, each day developers publish tens of thousands of package updates, as well as hundreds of new packages, to the npm repository alone.

BRIEF SUMMARY

The inventors have recognized that, due to the large number of packages being published on software repositories (e.g., Linux application distribution repositories, GitHub, npm, Docker Hub, etc.) every day, comprehensive manual auditing of those published packages is infeasible, and automated techniques are therefore needed. The invention detects potentially malicious package versions in a software repository in a manner that can be done automatically, and while being light on computing resource use. Additionally, invention can be applied to a software repository without making any changes to the fundamentals of how the software repository operates.

In particular, at least some embodiments herein are directed to a machine learning based approach for automatically detecting potentially malicious packages associated with a software repository. In embodiments, these techniques utilize a set of classifiers that are trained on known examples of malicious and benign packages. These classifiers are trained based on sets of features (e.g., feature vectors) that are extracted from these examples, and which include both single-version features and change features. Examples of single-version features include whether a subject package accesses personally identifying information (PII), whether the subject package accesses a specified system resource (e.g., file system, process, network), whether the subject package uses a specified application programming interface (API) (e.g., cryptographic, data encoding, dynamic code generation), whether the subject package includes an installation script, and whether the subject package includes at least one of a binary file, a minified file, or an obfuscated file. Examples of change features include an amount of time since publication of a prior version of the subject package, a semantic update type associated with the subject package, and an identification of how one or more single-version features have changed since the prior version of the subject package.

If a package is flagged as malicious by one or more classifiers, some embodiments check whether the package includes metadata about its source repository. If so, these embodiments determine whether the package can be reproduced from its source code. The inventors have observed that packages that are reproducible from source are usually benign (i.e., because malicious packages do not generally have their source code made publicly available), so reproduction from source code can weed out false positives (i.e., a mis-categorization of a benign package as being malicious). If a package is flagged as benign by one or more classifiers, some embodiments employ clone-detection techniques to determine if the package is a near-verbatim copy of a package already known to be malicious, reducing the number of false negatives (i.e., a mis-categorization of a malicious package as being benign).

The embodiments herein rely on lightweight feature extraction and classification that can be applied quickly and with few computing resources. In particular, the embodiments herein operate based on a classification of features extracted from static data (e.g., metadata) obtained from a package. As opposed to other potential analysis techniques, such as a deep code analysis or a dynamic code execution analysis, the embodiments herein utilize relatively few computing resources (e.g., processing, memory, etc.). Additionally, the embodiments herein have been observed to produce favorable results in practice; in a test, running the disclosed techniques on 96287 package versions published on npm over the course of one week identified 95 previously unknown malware samples, with a manageable number of false positives (e.g., fewer than a thousand).

In some aspects, the techniques described herein relate to a method, implemented at a computer system that includes a processor, for detecting a malicious package associated with a software repository, the method including: identifying a subject package associated with a software repository; extracting a feature set from the subject package, the feature set including: (a) one or more single-version features, including one or more of (i) whether the subject package accesses PII, (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and (b) one or more change features, including one or more of (i) an amount of time since publication of a prior version of the subject package, (ii) a semantic update type associated with the subject package, or (iii) an identification of how one or more single-version features have changed since the prior version of the subject package; providing the feature set as input to a set of classifiers, each classifier in the set of classifiers being configured to use the feature set to generate a prediction of whether the subject package is malicious or benign; and based at least on the prediction, classifying the subject package as being malicious or benign.

In some aspects, the techniques described herein relate to a computer system for detecting a malicious package associated with a software repository, including: a processor; and a computer storage media that stores computer-executable instructions that are executable by the processor to cause the computer system to at least: identify a subject package associated with a software repository; extract a feature set from the subject package, the feature set including: (a) one or more single-version features, including one or more of (i) whether the subject package accesses PII, (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and (b) one or more change features, including one or more of (i) an amount of time since publication of a prior version of the subject package, (ii) a semantic update type associated with the subject package, or (iii) an identification of how one or more single-version features have changed since the prior version of the subject package; provide the feature set as input to a set of classifiers, each classifier in the set of classifiers being configured to use the feature set to generate a prediction of whether the subject package is malicious or benign; and based at least on the prediction, classify the subject package as being malicious or benign.

In some aspects, the techniques described herein relate to a computer program product including a computer storage media that stores computer-executable instructions that are executable by a processor to cause a computer system to detect a malicious package in a software repository, the computer-executable instructions including instructions that are executable by the processor to cause the computer system to at least: identify a subject package associated with a software repository; extract a feature set from the subject package, the feature set including: (a) one or more single-version features, including one or more of (i) whether the subject package accesses PII, (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and (b) one or more change features, including one or more of (i) an amount of time since publication of a prior version of the subject package, (ii) a semantic update type associated with the subject package, or (iii) an identification of how one or more single-version features have changed since the prior version of the subject package; provide the feature set as input to a set of classifiers, each classifier in the set of classifiers being configured to use the feature set to generate a prediction of whether the subject package is malicious or benign; and based at least on the prediction, classify the subject package as being malicious or benign.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
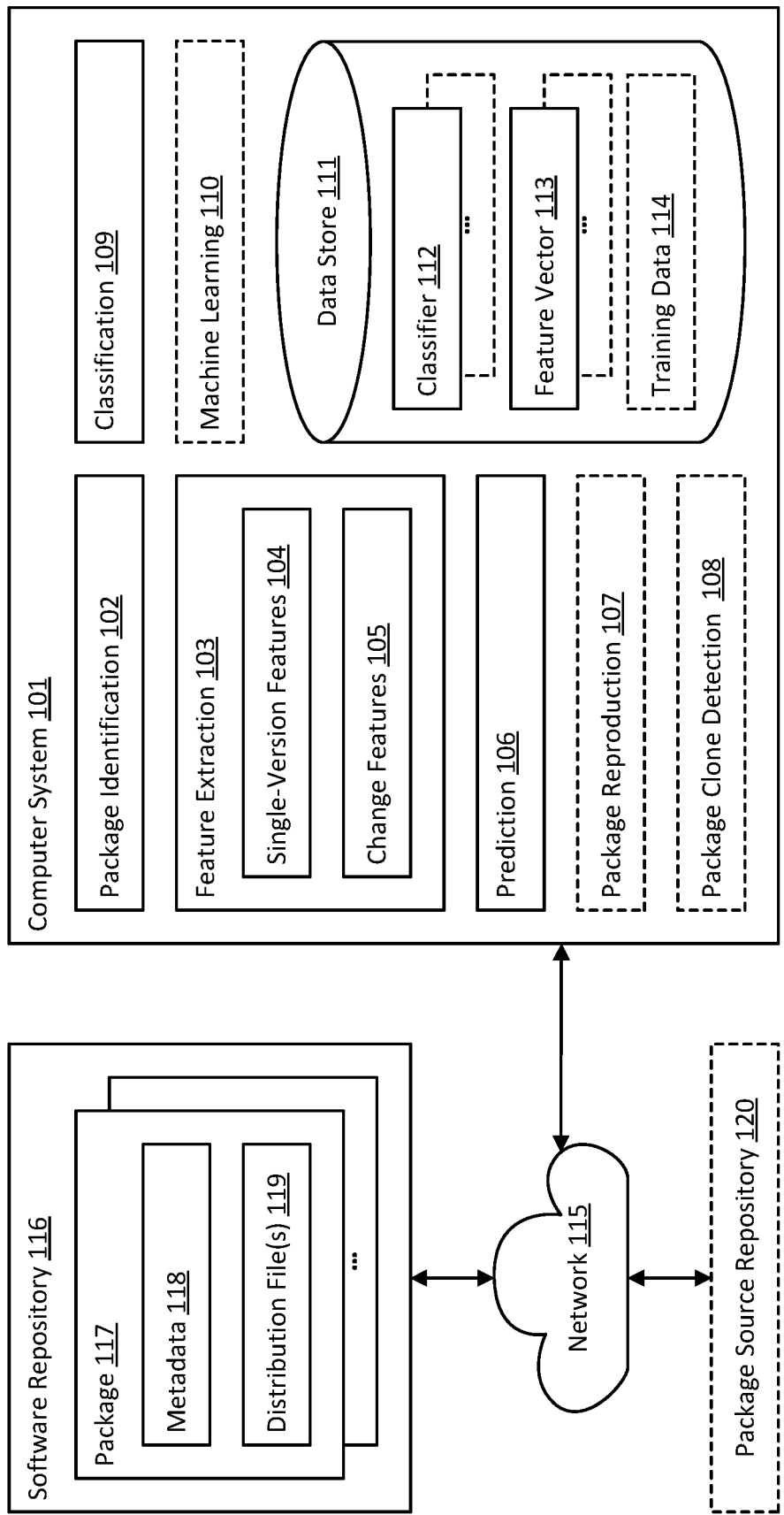
FIG. 1 illustrates an example computer architecture that facilitates automated detection of malicious packages in a software repository.

At least some embodiments herein are directed to a machine learning based approach for automatically detecting potentially malicious packages associated with a software repository. In embodiments, these techniques utilize a set of classifiers that are trained on known examples of malicious and benign packages. These classifiers are trained based on sets of features (e.g., feature vectors) that are extracted from these examples, and which include both single-version features and change features. Examples of single-version features include whether a subject package accesses personally identifying information (PII), whether the subject package accesses a specified system resource (e.g., file system, process, network), whether the subject package uses a specified application programming interface (API) (e.g., cryptographic, data encoding, dynamic code generation), whether the subject package includes an installation script, and whether the subject package includes at least one of a binary file, a minified file, or an obfuscated file. Examples of change features include an amount of time since publication of a prior version of the subject package, a semantic update type associated with the subject package, and an identification of how one or more single-version features have changed since the prior version of the subject package.

If a package is flagged as malicious by one or more classifiers, some embodiments check whether the package includes metadata about its source repository. If so, these embodiments determine whether the package can be reproduced from its source code. The inventors have observed that packages that are reproducible from source are not usually malicious (i.e., because malicious packages do not generally have their source code made publicly available), so reproduction from source code can weed out false positives. If a package is flagged as benign by one or more classifiers, some embodiments employ clone-detection techniques to determine if the package is a near-verbatim copy of a package already known to be malicious, reducing the number of false negatives.

Any type of machine learning algorithm, model, machine learning, or neural network may be used by the embodiments herein. As used herein, reference to "machine learning" or to a machine learning model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The embodiments herein therefore detect malicious packages using a novel combination of package features and classification techniques. The embodiments herein are efficient, usually taking only a few seconds per package to extract features and run a set of classifiers. Additionally, retraining classifiers is efficient, thus allowing continuous improvements to be made as more and more results are triaged. Additionally, false-positive rates drop significantly as the classifiers are retrained on more data.

As used herein, a "malicious package version" is a version of a software package that contains code that implements malicious behavior. As examples, malicious behavior includes exfiltrating sensitive or personal data, tampering with or destroying data, or performing long running or computationally expensive computations (e.g., that are not explicitly documented). In embodiments, a given package version is considered malicious even if the malicious code it contains is disabled, broken, or unintentional. For brevity, the term "malicious package version" is frequently shortened herein to "malicious package."

From an attacker's perspective, there are three steps to delivering malware through a software repository—step one: publish a malicious package version; step two: get users to install that malicious package; and step three: get users to run the malicious code within the malicious package.

One way to go about step one is to publish a completely new package. A classic way of achieving step two in this scenario is "typosquatting" whereby the name chosen for the new package is very similar to the name of an existing package (preferably, a popular package). Then, a user who accidentally misspells the name of the existing package will end up inadvertently installing the malicious package instead.

A more sophisticated approach to achieve step one is dependency confusion: the attacker identifies dependencies on a private package hosted in a private software repository, and then publishes a malicious package with the same name and a higher version number on a public software repository. Step two is then achieved if clients of the private package end up installing the malicious package instead. Additionally, there have been cases of attackers publishing an initially benign and useful package, getting it added as a dependency to a popular target package, and then publishing a malicious version of that package.

Another approach to achieve step one is for the attacker to compromise an existing benign package by gaining maintainer access (e.g., by stealing maintainer credentials or by social engineering), and then publishing a new, malicious version of that package. In this case, step two comes about naturally since the package already has users who will (either explicitly or implicitly) upgrade to the malicious version.

A tactic to achieve step three in any scenario is to embed installation scripts, which are run during package installation, and which can execute arbitrary code. However, in some package management systems the commands run by installation scripts may be logged, increasing the risk of detection. Hence, a more careful attacker may instead choose to hide their malicious code in some frequently executed bit of functionality in the main body of the package.

FIG. 1 illustrates an example computer architecture 100 that facilitates automated detection of malicious packages in a software repository. As shown, computer architecture 100 includes a computer system 101 and a software repository 116. In computer architecture 100, the computer system 101 and the software repository 116 are interconnected by a network 115; however, the software repository 116 could alternatively be integral to computer system 101.

The software repository 116 stores a plurality of packages, including package 117. Package 117, in turn, includes metadata 118 and distribution file(s) 119. In embodiments, the metadata 118 of a package comprises information about the package, itself, such as package name, package version, a changelog, a location of a corresponding package source repository 120, and the like. In embodiments, the distribution file(s) 119 of a package comprise the actual deliverable of the package, such as one or more binary files, one or more scripts (e.g., installation scripts), one or more source code files, and the like.

Figure 3:
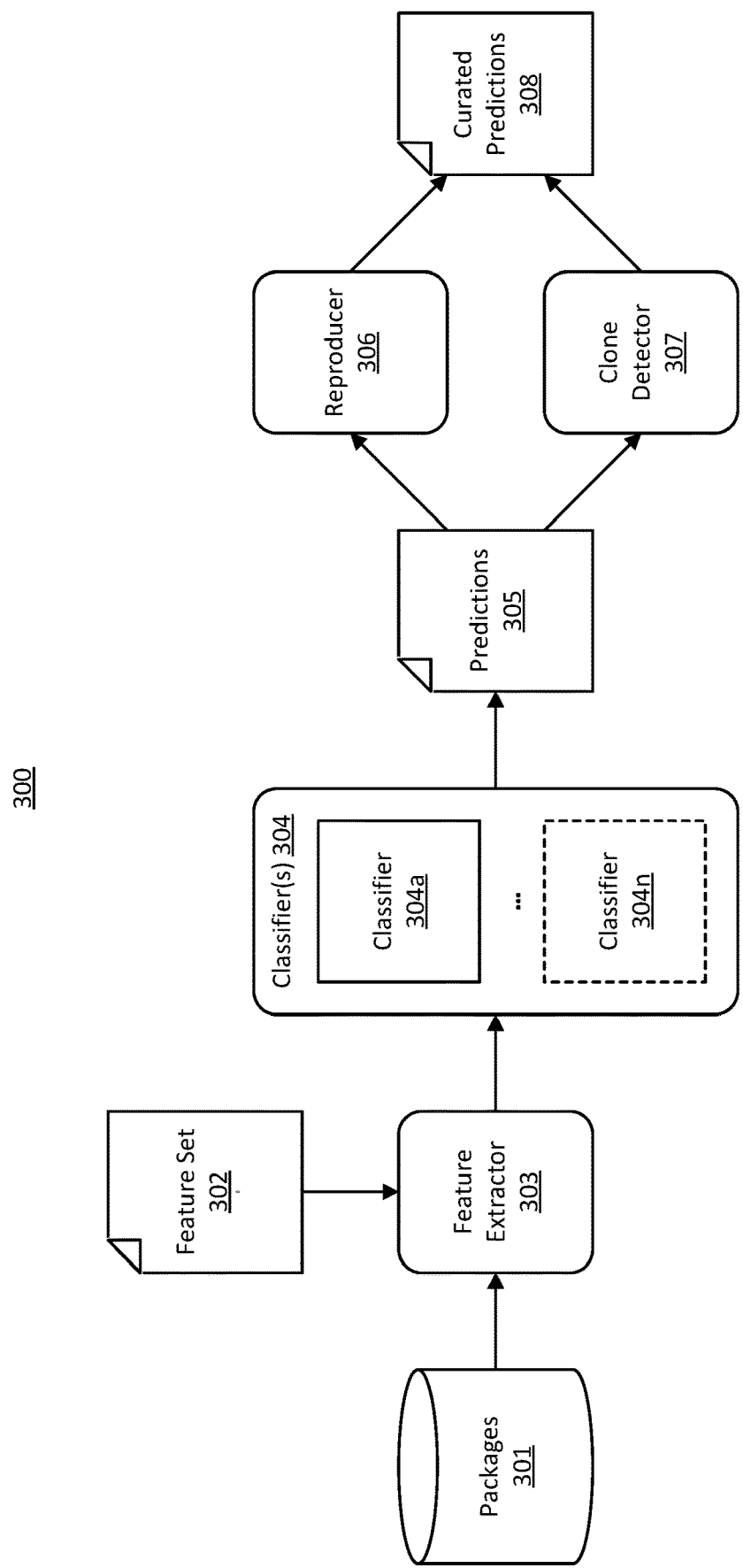
FIG. 3 illustrates an example process flow for automated detection of malicious packages in a software repository.

Computer system 101 utilizes a machine learning based approach to automatically detect potentially malicious packages associated with software repository 116. In particular, computer system 101 utilizes a set of classifiers (e.g., classifier(s) 112 within data store 111), each trained on known examples of malicious and benign packages. To this end, computer system 101 includes a package identification component 102, a feature extraction component 103, a prediction component 106, and a classification component 109. Additionally, in embodiments, the computer system 101 refines classifier predictions using package reproduction and/or package clone detection. To this end, computer system 101 may also include package reproduction component 107 and/or a package clone detection component 108. A description of these components is now given in connection with FIG. 3, which illustrates an example process flow 300 showing an overview of an automated detection of malicious packages in a software repository, using the components of computer architecture 100.

In embodiments, the package identification component 102 identifies one or more packages for which a classification is to be performed. For each identified package, the package identification component 102 identifies a particular version of the package. For example, referring to computer architecture 100, the package identification component 102 identifies package 117 from software repository 116. Referring to process flow 300, the package identification component 102 identifies a package from packages 301. In embodiments, the package identification component 102 identifies each package based on that package being newly submitted, or newly added, to the software repository 116 (e.g., as a new version of an existing package, or as an entirely new package). Thus, an identified package may be actively part of software repository 116, or may be in a package submission queue for software repository 116.

In embodiments, the feature extraction component 103 extracts a set of features from each package identified by the package identification component 102. As a result, the feature extraction component 103 generates at least one feature vector 113 (see data store 111) for the package, which is consumable by a classifier (e.g., one of classifier(s) 112) as an input. For example, in referring to process flow 300, a feature extractor 303 extracts a feature set 302 from each package identified from packages 301.

As shown in computer architecture 100, the feature extraction component 103 extracts a set of single-version features 104—i.e., features specific to the newly-added version of the package. In embodiments, the set of single-version features 104 includes one or more of (i) whether the newly-added version of the package accesses PII (e.g., credit-card numbers, passwords, cookies), (ii) whether the newly-added version of the package accesses a specified system resource, (iii) whether the newly-added version of the package uses a specified API, (iv) whether the newly-added version of the package includes installation script(s), or (v) whether the newly-added version of the package contains binary file(s) (e.g., binary executables), minified file(s) (e.g., source code having all unnecessary characters removed, which is often used to avoid detection), and/or obfuscated file(s). In embodiments, the feature extraction component 103 determines if the newly-added version of the package contains minified, binary, and/or obfuscated files based on a computation of Shannon entropy (i.e., these types of files generally having higher entropy than plain source code). In embodiments, access to a specified system resource includes one or more of (a) file system access (e.g., reading and writing files), (b) process creation (e.g., spawning new processes), or (c) network access (e.g., sending or receiving data). In embodiments, use of a specified API includes one or more of (a) a cryptographic API, (b) a data encoding API (e.g., encodeURIComponent), or (c) a dynamic code generation API (e.g., eval, Function, etc.).

Notably, each of these single-version features tends to be innocuous by themselves, and appear in both benign and malicious packages. However, the inventors have observed that malicious packages tend to exhibit combinations of these features (e.g., access to file system and network APIs in order to steal confidential data and then send it to a remote host). Thus, use of combinations of these single-version features as part of a machine learning analysis can be very effective at identifying malicious behaviors.

Additionally, as shown, the feature extraction component 103 also extracts a set of change features 105—i.e., features derived by comparing the newly-added version of the package with a prior version of the package. The inventors have observed that use of change features can carry more signal than using single-version features alone.

In embodiments, the set of change features 105 includes one or more of (i) an amount of time since publication of the prior version of the package to the software repository 116, (ii) a semantic update type associated with the package (e.g., major, minor, patch, build, or pre-release), or (iii) an identification of how one or more single-version features have changed since the prior version of the subject package. In embodiments, a motivation for considering time between updates is that malicious package versions often exhibit unusual update patterns—such as multiple versions published in very rapid succession, or a new version being published after years of inactivity (which might suggest an account takeover). The semantic update type, on the other hand, can determine whether a change in some other feature is suspicious or not (e.g., use of a new API may be suspicious if it appears in a patch update, but less suspicious if it appears in a major update).

With respect to identifying how single-version feature(s) have changed since the prior version of the subject package, the inventors have observed that there are typical patterns of how single-version features change that are particularly suspicious. This is because a more sophisticated malicious package may start out behaving like a benign package in order to entice users to install it, with the malicious behavior being added in a subsequent update. Similarly, a malicious attacker may be able to compromise a benign package and publish a malicious version of that package, thereby impacting its existing user base. In both of these scenarios, a package typically starts using features in a new version that were never used before. As such, in embodiments, the feature extraction component 103 determines how the values of single-version features have changed, and incorporates those changes into the change features 105. As examples, the change features 105 include whether the newly-added version of the package now accesses a type of PII that the prior version of the package did not, whether the newly-added version of the package uses a system resource that the prior version of the package did not, whether the newly-added version of the package uses an API that the prior version of the package did not, whether the newly-added version of the package includes an installation script that the prior version of the package did not, and/or whether the newly-added version of the package includes a minified, binary, or obfuscated file that the prior version of the package did not.

In embodiments, in order to accommodate the first version of a package, embodiments compute change features for the first version of a package by treating it as an update from an idealized empty package. As an example, embodiments consider the first version of the package to have a pseudo-update type representing a first version, consider its time between a prior update to be zero, and take the values of the single-version features to be the remaining change features. This enables detection of both malicious updates, where a previously benign package becomes malicious, as well as packages that were malicious from the start. Notably, computing change features for the first version of a package by treating it as an update from an idealized empty package provides stronger signal of change features for successive versions than would be otherwise possible, while also accommodating initial versions using the same feature vector framework.

In embodiments, the prediction component 106 uses the feature vector (e.g., feature vector 113) generated by the feature extraction component 103 as an input to a set of one or more classifiers, such as classifier(s) 112 in computer system 101 or classifier(s) 304 (i.e., classifier 304a to classifier 304n) in process flow 300. Based on an input feature vector, each classifier generates a prediction (e.g., predictions 305 in process flow 300) of whether the corresponding package is malicious or benign.

By extracting and using single-version and features change features as inputs to machine learning classifiers, the embodiments herein are simpler and more lightweight than other potential techniques; for example, the embodiments herein avoid potentially computationally expensive deep static analysis (e.g., static code analysis) or potentially dangerous code execution for dynamic analysis. Nonetheless, the embodiments herein have been observed to produce favorable results in practice; in a test, running the disclosed techniques on 96287 package versions published on npm over the course of one week identified 95 previously unknown malware samples, with a manageable number of false positives (e.g., fewer than a thousand).

Figure 2:
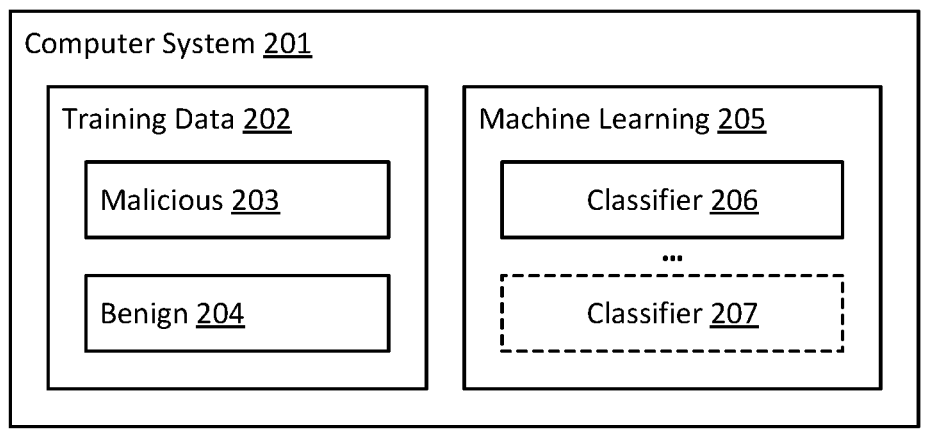
FIG. 2 illustrates an example computer architecture that facilitates training a set of machine learning classifiers.

In embodiments, the set of classifiers (e.g., classifier(s) 304) are trained (e.g., using a machine learning component 110) using training data (e.g., training data 114 within data store 111) comprising feature vectors extracted from a corpus of example packages that are known to be malicious or benign, with those feature vectors being labeled as malicious or benign. In some embodiments, the set classifiers are trained at computer system 101 (i.e., based on the machine learning component 110 and the training data 114). In other embodiments, the set classifiers are trained at another computer system. For example, FIG. 2 illustrates an example computer architecture 200 that facilitates training a set of machine learning classifiers. Computer architecture 200 includes a computer system 201 that includes training data 202 and a machine learning component 205. As shown, the training data 202 includes a corpus of malicious 203 examples (i.e., corresponding to feature vectors extracted from packages that are known to be malicious), as well as corpus of benign 204 examples (i.e., corresponding to feature vectors extracted from packages that are known to be benign). The machine learning component 205 uses this training data 202 to train one or more classifiers, such as the depicted classifier 206 and classifier 207. By training on a corpus of malicious and benign packages, the classifiers learn to distinguish typical (and therefore most likely harmless) features and feature changes from atypical (and therefore suspicious) ones.

In embodiments, the set of classifiers (e.g., classifier(s) 304) includes one or more of a decision tree classifier, a Naive Bayesian classifier, or a one-class SVM classifier. The inventors have observed that combinations of these classifiers can be beneficial to balance precision with the ability to identify novel malicious packages. For example, in experiments, the decision tree classifier has shown to be the most precise of the three (e.g., producing the lowest rate of false-positives), but to miss some novel malicious packages that the other classifiers catch. As such, complementing the decision tree classifier with at least one of the Naive Bayesian classifier or the one-class SVM classifier improves the ability to identify novel malware. While the inventors identified the decision tree classifier, the Naive Bayesian classifier, and the one-class SVM classifier as potentially useful, the embodiments herein can utilize any combination of classifier types. Examples of other candidates include Random Forest classifiers and k-means clustering.

Figure 4:
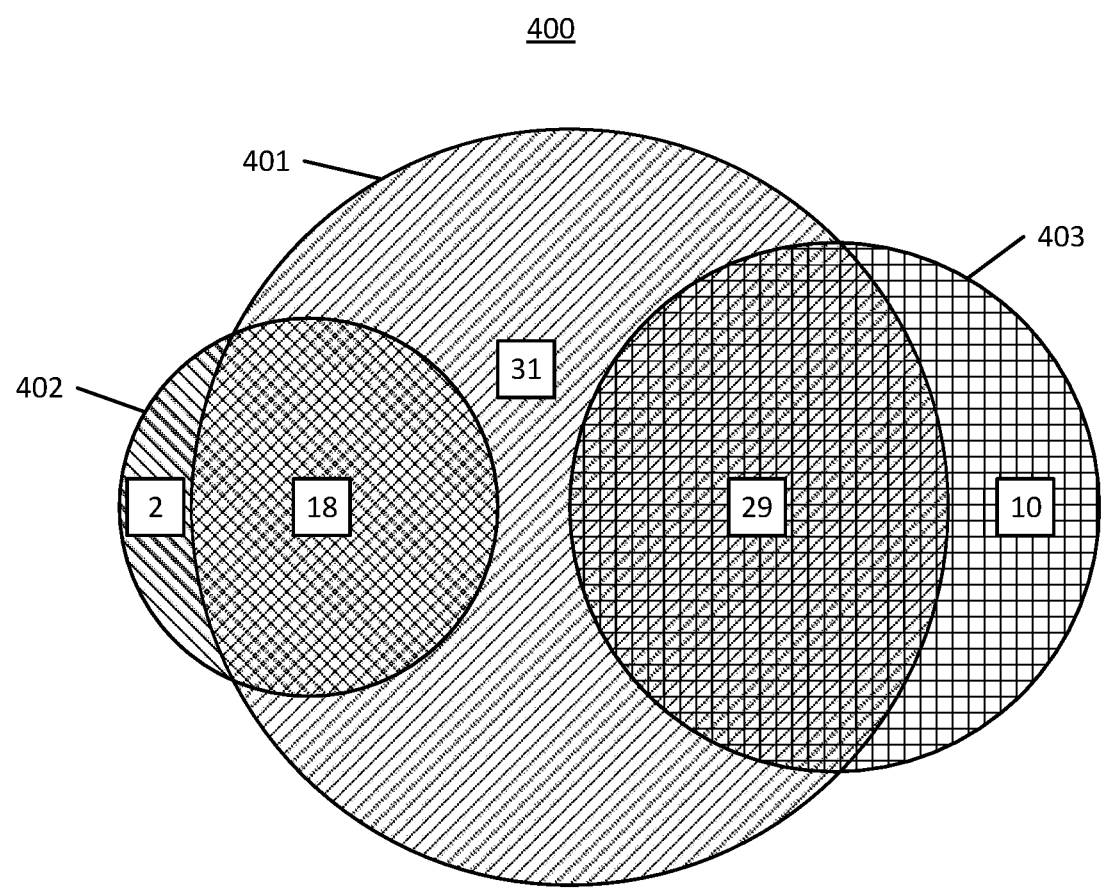
FIG. 4 illustrates an example Venn diagram showing a relation between classifier predictions.

FIG. 4 illustrates an example Venn diagram 400 showing a relation between classifier predictions, when using a decision tree classifier, a Naive Bayesian classifier, and a one-class SVM classifier that have each been trained according to the embodiments herein to classify 96287 package versions from npm software repository. In Venn diagram 400, set 401 corresponds to packages identified as malicious by the decision tree classifier, set 402 corresponds to packages identified as malicious by the Naive Bayesian classifier, and set 403 corresponds to packages identified as malicious by the one-class SVM classifier. Venn diagram 400 shows that, of the 90 packages flagged by these classifiers, the decision tree classifier uniquely contributes 31, with a significant overlap with the other two classifiers. Additionally, the Naive Bayesian classifier uniquely contributes two, and the one-class SVM classifier uniquely contributes ten. While the decision tree classifier makes the largest contribution, each classifier makes its own unique contribution—suggesting that a combination of all three is beneficial in practice.

In embodiments, the classification component 109 uses the predictions generated by the prediction component 106 (e.g., predictions 305) to classify each package identified by the package identification component 102 as being malicious or benign. As shown in process flow 300 the result of predictions 308.

In some embodiments, the classification component 109 considers a combination of results from a plurality of classifiers. In various examples, the classification component 109 may consider a package to be malicious only if it is predicted to be malicious by all classifiers, only if it is predicted to be malicious by a majority classifiers, or if it is predicted to be malicious by any classifier.

Additionally, or alternatively, in some embodiments the classification component 109 applies further filtering, or triage, to the predictions generated by the prediction component 106. As shown in process flow 300, this can include use of a reproducer 306 (e.g., package reproduction component 107) to eliminate false positives. Use of a reproducer 306 is based on an observation that malicious package versions tend not to have their source code publicly available, in order to avoid detection. Consequently, being able to reproduce a package version from its source code is a good indicator that it is benign. Thus, in embodiments, the classification component 109 utilizes the package reproduction component 107 to determine if a package that has been predicted to be malicious can be reproduced from source code. If so, the classification component 109 classifies the package as benign. It is noted that even benign packages may fail to reproduce for a variety of reasons. However, this is acceptable because the embodiments herein use this criterion to filter out benign packages erroneously flagged as malicious, rather than to initially detect a package as being malicious.

As shown in process flow 300, further filtering, or triage, can also include use of a clone detector 307 (e.g., package clone detection component 108) to detect false negatives. Use of a clone detector 307 is based on an observation that attackers often publish multiple textually identical copies of the same malicious package under different names. Thus, in embodiments, the package clone detection component 108 determines if a package that has been predicted to be benign is a clone of a known malicious package. Since some of the package metadata may be different, however, in embodiments the package clone detection component 108 detects clones based on hashing the contents of packages, less unique data such as minus the package name and version. If the hash of a subject package matches the hash of a known malicious package, the classification component 109 classifies the subject package as malicious. Embodiments can use any form of hash, including both precise and fuzzy hashing techniques.

In some embodiments, computer system 101 automatically removes packages detected to be malicious from the software repository 116. In other embodiments, the computer system 101 submits those packages for human review. In some embodiments, the classification component 109 also classifies malicious packages with a review priority, such as based on a download count, a dependency count, a user rating, and the like.

In embodiments, the results of the classification component 109 are used to refine the training data 114/202 and re-train the classifier(s) 112. For example, if a package is classified as malicious, it is added to the corpus of malicious 203 examples, and if the package is classified as benign, it is added to the corpus of benign 204 examples. The machine learning component 110/205 subsequently re-trains the classifier based on the updated training data.

Figure 5:
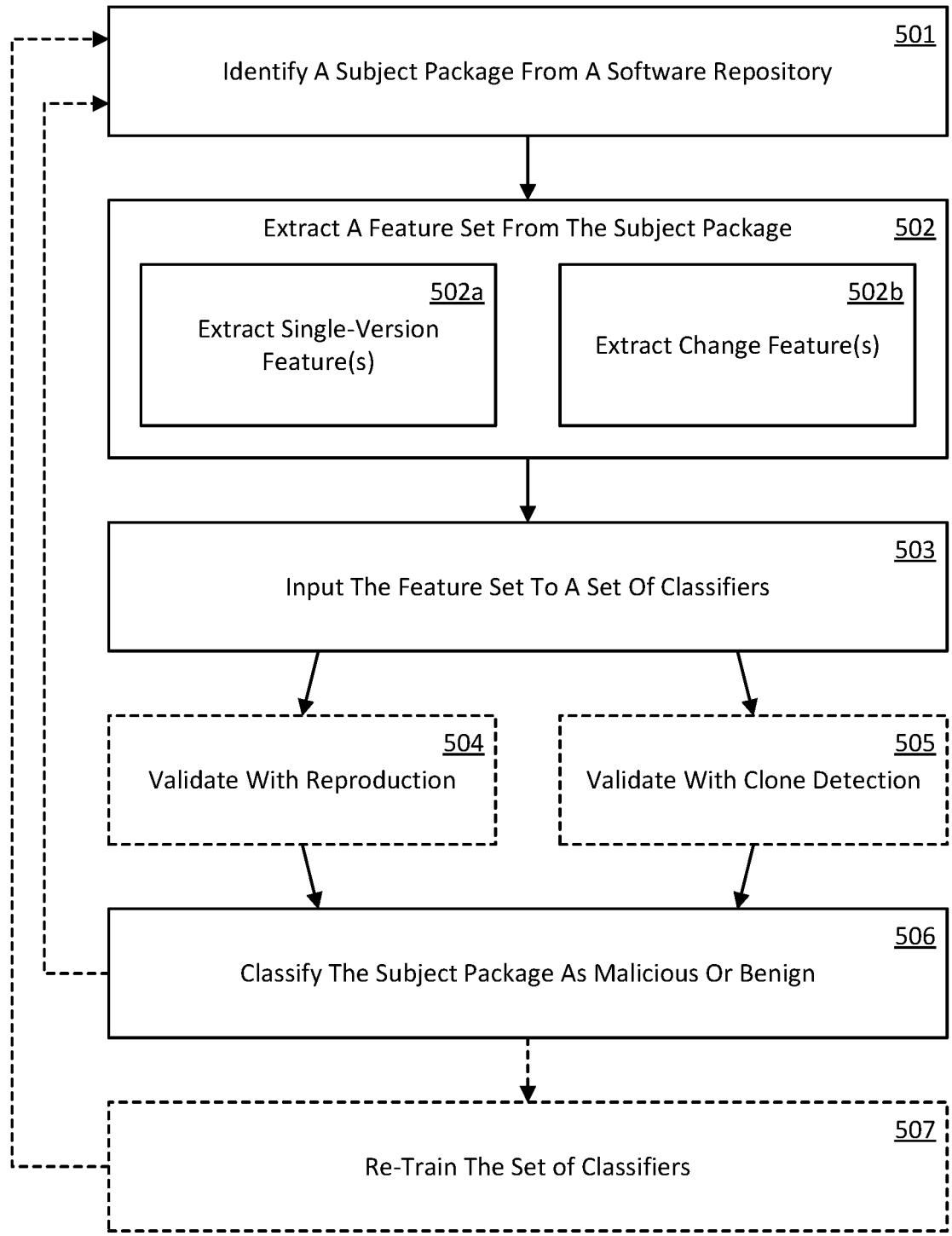
FIG. 5 illustrates a flow chart of an example method for detecting a malicious package associated with a software repository.

Components of computer architecture 100 are now described further in connection with FIG. 5, which illustrates a flow chart of an example method 500 for detecting a malicious package associated with a software repository. In embodiments, instructions for implementing method 500 are encoded as computer-executable instructions stored on a computer program product that are executable by a processor to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 5, in embodiments, method 500 comprises an act 501 of identifying a subject package from a software repository. In some embodiments, act 501 comprises identifying a subject package associated with a software repository. In an example, the package identification component 102 identifies package 117 from software repository 116. The techniques herein are applicable to a broad variety of software repositories. As such, in embodiments of method 500, the software repository is one of a code library repository (e.g., npm), an application distribution repository (e.g., a RPM or deb based repository), a source code repository (e.g., GitHub), or a container repository (e.g., Docker Hub).

Method 500 also comprises an act 502 of extracting a feature set from the subject package. In some embodiments, act 502 comprises extracting a feature set from the subject package, the feature set including (a) one or more single-version features and (b) one or more change features. In an example, the feature extraction component 103 extracts single-version features 104 and change features 105 from the package 117 identified by the package identification component 102, in order to generate feature vector 113.

As shown, act 502 comprises an act 502a of extracting single-version feature(s). In some embodiments, act 502a comprises extracting one or more single-version features, including one or more of (i) whether the subject package accesses PII, (ii) whether the subject package accesses a specified system resource, (iii) whether the subject package uses a specified API, (iv) whether the subject package includes an installation script, or (v) whether the subject package includes at least one of a binary file, a minified file, or an obfuscated file. In embodiments, when the one or more single-version features include whether the subject package accesses a specified system resource, the specified system resource includes at least one of: (a) file system access, (b) process creation, or (c) network access. In embodiments, when the one or more single-version features include whether the subject package uses a specified API, the specified API includes at least one of: (a) a cryptographic API, (b) a data encoding API, or (c) a dynamic code generation API. In embodiments, extraction of single-version features 104 is performed on static data, such as metadata 118 or static information (e.g., file type, dependency information etc.) within distribution file(s) 119. As such, extraction of single-version features 104 can be performed in a resource-light manner. In embodiments, extraction of single-version features 104, enables classification of a package based on features specific to that package.

As shown, act 502 also comprises an act 502b of extracting change feature(s). In some embodiments, act 502b comprises extracting one or more change features, including one or more of (i) an amount of time since publication of a prior version of the subject package, (ii) a semantic update type associated with the subject package, or (iii) an identification of how one or more single-version features have changed since the prior version of the subject package. In embodiments, extraction of change features 105 is performed on static data, such as metadata 118 or static information (e.g., file type, dependency information etc.) within distribution file(s) 119. As such, extraction of change features 105 can also be performed in a resource-light manner. In embodiments, extraction of change features 105, enables classification of a package based on differences between a current version of the package and a prior version of the package.

As mentioned, in embodiments, in order to accommodate the first version of a package, embodiments compute change features for the first version of a package by treating it as an update from an idealized empty package. Thus, in some embodiments of act 502, the subject package is an initial version of the package, and the prior version of the subject package is treated as an empty package. In one example, an amount of time since publication of a prior version of the subject package is determined to be zero, the semantic update type associated with the subject package is pseudo-update type representing a first version, and the identification of how one or more single-version features have changed since the prior version of the subject package includes the single-version features themselves.

Method 500 also comprises an act 503 of inputting the feature set to a set of classifiers. In some embodiments, act 503 comprises providing the feature set as input to a set of classifiers, each classifier in the set of classifiers being configured to use the feature set to generate a prediction of whether the subject package is malicious or benign. In an example, the prediction component 106 inputs the feature vector 113 generated in act 502 to a set of classifiers (e.g., classifier(s) 112) that have each been trained using training data training data 114 comprising similar feature vectors that have been labeled as corresponding to known malicious or benign packages. Each of these classifiers generates a prediction (e.g., predictions 305) of whether the package is malicious or benign. In embodiments, the set of classifiers include a decision tree classifier, a Naive Bayesian classifier, and a one-class SVM classifier.

In some embodiments, method 500 also comprises an act 504 of validating with reproduction. In some embodiments, act 504 comprises, based at least on a prediction that subject package is malicious, creating a reproduced build of the subject package from source; and determining if the reproduced build of the subject package is equivalent to the subject package. In an example, based on the package being classified as malicious by at least one classifier, the computer system 101 uses the package reproduction component 107 to reproduce a build of the package 117 from source (i.e., package source repository 120) and determine if the reproduced build is equivalent to package 117.

In some embodiments, method 500 also comprises an act 505 of validating with clone detection. In some embodiments, act 505 comprises, based at least on a prediction that subject package is benign, determining whether the subject package is a clone of another package that is known to be malicious (e.g., because it is in training data 114, or because it has otherwise been flagged as malicious previously). In an example, based on the package being classified as benign by all classifiers, the computer system 101 uses the package clone detection component 108 to determine if package 117 is a clone of a known malicious package (e.g., based on hashing contents of packages, less unique data such as minus the package name and version).

Method 500 also comprises an act 506 of classifying the subject package as malicious or benign. In some embodiments, act 506 comprises based on at least on the prediction, classifying the subject package as being malicious or benign. In an example, the classification component 109 uses at least the output of the prediction component 106 to classify package 117 as malicious or benign. In various examples, the classification component 109 may classify a package to be malicious only if it is predicted to be malicious by all classifiers, only if it is predicted to be malicious by a majority classifiers, or if it is predicted to be malicious by any classifier.

In embodiments, if method 500 includes act 504, then act 506 includes classifying the subject package as being benign when the reproduced build of the subject package is equivalent to the subject package. For example, if the package reproduction component 107 is able to reproduce an equivalent build of the package 117 in act 504, then the classification component 109 classifies package 117 as benign.

In embodiments, if method 500 includes act 505, then act 506 includes classifying the subject package as being malicious when the subject package is determined to be a clone of another package in the software repository. For example, if package clone detection component 108 determines that package 117 is a clone of a known malicious package in act 505, then the classification component 109 classifies package 117 as malicious.

In some embodiments, if the subject package is classified as being malicious, then method 500 further comprises, based at least on classifying the subject package as being malicious, automatically removing the subject package from the software repository.

In other embodiments, if the subject package is classified as being malicious, then method 500 further comprises, based at least on classifying the subject package as being malicious, flagging the package for human review. In embodiments, when the package is flagged for human review, the classification component 109 also classifies the package with a review priority, such as based on a download count, a dependency count, a user rating, and the like. Thus, in some embodiments, method 500 further comprises, based at least on classifying the subject package as being malicious, attaching a priority to the subject package.

As shown by a broken arrow between act 506 and act 501, method 500 can repeat any number of times to classify additional packages from the software repository 116.

In some embodiments, the results of the classification component 109 are used to refine the training data 114/202 and re-train the classifier(s). Thus, in some embodiments, method 500 also comprises an act 507 of re-training the set of classifiers. In some embodiments, act 507 comprises updating a training data set based on the feature set and a classification of whether the subject package is malicious or benign (e.g., by a human assessment, by the classification component 109, etc.), and then re-training the set of classifiers using the updated training data set. In an example, if a package is classified as malicious, it is added to the corpus of malicious 203 examples, and if the package is classified as benign, it is added to the corpus of benign 204 examples. The machine learning component 110/205 subsequently re-trains the classifier based on the updated training data. This has the effect of refining the accuracy of the classifiers over time. While embodiments of act 507 could re-train the classifier(s) based on automated classifications made by the computer system 101, in embodiments it is advantageous to re-train the classifier(s) based on a human review/verification of classifications that were made by the computer system 101, in order to include cases where a human reviewer disagrees with the automated prediction, improving accuracy of the classifier(s) in the future.

As shown by a broken arrow between act 507 and act 501, after re-training the set of classifiers in act 507, method 500 could repeat to classify (or re-classify) additional packages from the software repository 116 based on the re-trained classifiers.

Accordingly, the embodiments herein are directed to a machine learning based approach for automatically detecting potentially malicious packages associated with a software repository. In embodiments, these techniques utilize a set of classifiers that are trained on known examples of malicious and benign packages. These classifiers are trained based on sets of features (e.g., feature vectors) that are extracted from these examples, and which include both single-version features and change features. Examples of single-version features include whether a subject package accesses PII, whether the subject package accesses a specified system resource (e.g., file system, process, network), whether the subject package uses a specified API (e.g., cryptographic, data encoding, dynamic code generation), whether the subject package includes an installation script, and whether the subject package includes at least one of a binary file, a minified file, or an obfuscated file. Examples of change features include an amount of time since publication of a prior version of the subject package, a semantic update type associated with the subject package, or (iii) an identification of how one or more single-version features have changed since the prior version of the subject package.

If a package is flagged as malicious by one or more classifiers, some embodiments check whether the package includes metadata about its source repository. If so, these embodiments determine whether the package can be reproduced from its source code. The inventors have observed that packages that are reproducible from source are not usually malicious (i.e., because malicious packages do not generally have their source code made publicly available), so reproduction from source code can weed out false positives. If a package is flagged as benign by one or more classifiers, some embodiments employ clone-detection techniques to determine if the package is a near-verbatim copy of a package already known to be malicious, reducing the number of false negatives.

The embodiments herein therefore detect malicious packages using a novel combination of package features and classification techniques. The embodiments herein are efficient, usually taking only a few seconds per package to extract features and run a set of classifiers. Additionally, retraining classifiers is efficient, thus allowing continuous improvements to be made as more and more results are triaged. Additionally, false-positive rates drop significantly as the classifiers are retrained on more data; in experiments, fewer than one in a thousand packages were flagged spuriously.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101, computer system 201) that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset"

is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for detecting a malicious package associated with a software repository, the method comprising:
identifying a subject package associated with a software repository, wherein the subject package is an initial version of the subject package;
extracting a feature set from the subject package, the feature set including:
(a) one or more single-version features, including one or more of (i) whether the subject package accesses personally identifying information (PII), (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and
(b) one or more change features, including one or more of (i) an amount of time since publication of a prior version of the subject package, (ii) a semantic update type associated with the subject package, or (iii) an identification of how one or more single-version features have changed since the prior version of the subject package, wherein the prior version of the subject package is treated as an empty package;
providing the feature set as input to a set of classifiers, each classifier in the set of classifiers being configured to use the feature set to generate a prediction of whether the subject package is malicious or benign; and
based at least on the prediction, classifying the subject package as being malicious or benign.

2. The method of claim 1, wherein the one or more single-version features include whether the subject package accesses PII.

3. The method of claim 1, wherein the one or more single-version features include whether the subject package accesses a specified system resource, and wherein the specified system resource includes at least one of: (a) file system access, (b) process creation, or (c) network access.

4. The method of claim 1, wherein the one or more single-version features include whether the subject package uses a specified API, and wherein the specified API includes at least one of:
(a) a cryptographic API, (b) a data encoding API, or (c) a dynamic code generation API.

5. The method of claim 1, wherein the one or more single-version features include whether the subject package includes an installation script.

6. The method of claim 1, wherein the one or more single-version features include whether the subject package includes at least one of a binary file, a minified file, or an obfuscated file.

7. The method of claim 1, wherein the one or more change features include the amount of time since publication of the prior version of the subject package.

8. The method of claim 1, wherein the one or more change features include the semantic update type associated with the subject package.

9. The method of claim 1, further comprising, based at least on classifying the subject package as being malicious, automatically removing the subject package from the software repository.

10. The method of claim 1, further comprising, based at least on classifying the subject package as being malicious, attaching a priority to the subject package.

11. The method of claim 1, further comprising:
updating a training data set based on the feature set and the prediction of whether the subject package is malicious or benign; and
re-training the set of classifiers using the updated training data set.

12. The method of claim 1, further comprising, based at least on a prediction that subject package is malicious:
creating a reproduced build of the subject package from source;
determining if the reproduced build of the subject package is equivalent to the subject package; and
classifying the subject package as being benign when the reproduced build of the subject package is equivalent to the subject package.

13. The method of claim 1, further comprising, based at least on a prediction that subject package is benign:
determining whether the subject package is a clone of another package in the software repository; and
classifying the subject package as being malicious when the subject package is determined to be a clone of another package in the software repository.

14. The method of claim 1, wherein the set of classifiers include a decision tree classifier, a Naive Bayesian classifier, and a one-class support vector machine classifier.

15. The method of claim 1, wherein the software repository is one of a code library repository, an application distribution repository, a source code repository, or a container repository.

16. The method of claim 1, wherein treating the prior version of the subject package as an empty package includes at least one of,
determining that the amount of time since publication of the prior version of the subject package is zero,
determining that the semantic update type associated with the subject package is a pseudo-update type representing a first version of the subject package, or
determining that the identification of how one or more single-version features have changed since the prior version of the subject package includes identifying a single-version feature, itself.

17. A computer system for detecting a malicious package associated with a software repository, comprising:
a processor; and
a computer storage media that stores computer-executable instructions that are executable by the processor to cause the computer system to at least:
identify a subject package associated with a software repository, wherein the subject package is an initial version of the subject package;
extract a feature set from the subject package, the feature set including:
(a) one or more single-version features, including one or more of (i) whether the subject package accesses personally identifying information (PII), (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and (b) one or more change features, including one or more of (i) an amount of time since publication of a prior version of the subject package, or (ii) a semantic update type associated with the subject package, wherein the prior version of the subject package is treated as an empty package;

provide the feature set as input to a set of classifiers, each classifier in the set of classifiers being configured to use the feature set to generate a prediction of whether the subject package is malicious or benign; and based at least on the prediction, classify the subject package as being malicious or benign.

18. The computer system of claim 17, the computer-executable instructions also including instructions that are executable by the processor to cause the computer system to, based at least on a prediction the subject package is malicious:

create a reproduced build of the subject package from source;

determine if the reproduced build of the subject package is equivalent to the subject package; and classify the subject package as being benign when the reproduced build of the subject package is equivalent to the subject package.

19. The computer system of claim 17, the computer-executable instructions also including instructions that are executable by the processor to cause the computer system to, based at least on a prediction that the subject package is benign:

determine whether the subject package is a clone of another package in the software repository; and classify the subject package as being malicious when the subject package is determined to be a clone of another package in the software repository.

20. A hardware storage device that stores computer-executable instructions that are executable by a processor to cause a computer system to detect a malicious package in a software repository, the computer-executable instructions including instructions that are executable by the processor to cause the computer system to at least:

identify a subject package associated with a software repository, wherein the subject package is an initial version of the subject package;

extract a feature set from the subject package, the feature set including:

(a) one or more single-version features, including one or more of (i) whether the subject package accesses personally identifying information (PII), (ii) whether the subject package accesses a specified system resource, (iii) whether the subject package uses a specified application programming interface (API), (iv) whether the subject package includes an installation script, or (v) whether the subject package includes at least one of a binary file, a minified file, or an obfuscated file, and (b) one or more change features, including one or more of (i) an amount of time since publication of a prior version of the subject package, or (ii) a semantic update type associated with the subject package, wherein the prior version of the subject package is treated as an empty package;

provide the feature set as input to a set of classifiers, each classifier in the set of classifiers being configured to use the feature set to generate a prediction of whether the subject package is malicious or benign; and based at least on the prediction, classify the subject package as being malicious or benign.

* * * * *